(12) United States Patent
Furuta et al.

(10) Patent No.: US 6,328,075 B1
(45) Date of Patent: Dec. 11, 2001

(54) HOSE FOR TRANSPORTING CARBON DIOXIDE REFRIGERANT

(75) Inventors: Norihiko Furuta, Komaki; Nobuaki Niki, Inuyama; Ayumu Ikemoto, Komaki, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/480,671

(22) Filed: Jan. 11, 2000

(30) Foreign Application Priority Data

Jan. 11, 1999 (JP) .................................... 11-003596

(51) Int. Cl.$^7$ ....................................... F16L 9/14
(52) U.S. Cl. ......................... 138/143; 138/127; 138/146
(58) Field of Search .............................. 138/124, 125, 138/126, 127, 129, 138, 143, 146

(56) References Cited

U.S. PATENT DOCUMENTS

| 4,510,974 | * | 4/1985 | Natori et al. ........................ 138/137 |
| 5,271,977 | | 12/1993 | Yoshikawa et al. . |
| 5,476,121 | | 12/1995 | Yoshikawa et al. . |
| 5,488,975 | * | 2/1996 | Chiles et al. ........................... 138/124 |
| 5,688,556 | * | 11/1997 | Wagner, Jr. ......................... 427/248.1 |
| 5,718,956 | * | 2/1998 | Gladfelter et al. ................... 428/35.9 |
| 6,074,717 | * | 6/2000 | Little et al. .......................... 428/35.7 |

FOREIGN PATENT DOCUMENTS

| 04131233 | 5/1992 | (JP) . |
| 11264488 | 9/1999 | (JP) . |

* cited by examiner

*Primary Examiner*—James Hook
(74) *Attorney, Agent, or Firm*—Jacobson Holman, PLLC

(57) ABSTRACT

A hose for transporting carbon dioxide refrigerant has a wall formed by a plurality of layers, in which at least one metallic layer impermeable to carbon dioxide is positioned between a radially inner layer and a radially outer layer in its wall. The impermeable layer is a metallic layer formed by vapor deposition, or a laminated layer of at least one resin film and at least one metallic layer formed by vapor deposition. The hose is highly impermeable to carbon dioxide refrigerant, and maintains this impermeability with a high degree of reliability even when the hose is stretched.

2 Claims, 5 Drawing Sheets

HOSE FOR TRANSPORTING CARBON DIOXIDE REFRIGERANT

BACKGROUND OF THE INVENTION

1. Field of the Invention

This invention relates to a hose which can beneficially be used for transporting carbon dioxide as a refrigerant in an automobile air conditioner or the like. More particularly, it relates to a hose having an improved and reliable impermeability to carbon dioxide having a very low molecular weight as compared with flons such as Freons, even when it is subjected to high temperature and pressure.

2. Description of the Related Art

There has been a large demand for a hose having a wall not allowing the permeation of the refrigerant transported therein, and thereby overcoming various problems including the destruction of the ozone layer by Freons, or satisfying various requirements including a demand for a cooler system not calling for any replenishment of its refrigerant. The transportation of carbon dioxide as a refrigerant has, among others, been found to require an improved hose, since it has a low molecular weight and easily permeates through the wall of the hose, particularly when the hose is subjected to high temperature and pressure.

Accordingly, there has been proposed a hose having a wall composed of a plurality of layers including a rubber layer and an impermeable(or low-permeable) layer formed from a resin having a relatively high impermeability to a refrigerant, such as EVOH or nylon, or a like layer formed of a metallic foil having a high impermeability to a refrigerant. An impermeable layer formed from a resin, however, requires a considerably large thickness for the wall of a hose to resist the permeation of carbon dioxide transported as a refrigerant for a compressor in an automobile or the like. The hose is, therefore, likely to lack flexibility and have its wall cracked, or have its impermeable layer separated from a rubber layer adjoining it, due to a bending stress produced by the vibration of the compressor or the automobile.

A layer formed of a metallic foil, particularly a laminate of foils united by a fused resin film to increase the strength, is useful for making a hose having a wall of high impermeability to carbon dioxide without depriving it of flexibility. The pressure to which the hose is subjected is, however, so high that the expansion or elongation of the hose may cause the stretching of its wall resulting in the breakage of the foil. Thus, the impermeability of the wall will be seriously lowered at the critical point of breakage of the layer.

SUMMARY OF THE INVENTION

It is, therefore, an object of this invention to provide a hose which can beneficially be used to transport carbon dioxide refrigerant, since its wall has a satisfactorily high level of impermeability to carbon dioxide while retaining its flexibility, thus obviating the critical point of breakage causing remarkable decrease in impermeability due to the expansion or elongation of the hose.

This object is essentially attained by a hose having a wall formed by a plurality of layers including at least one impermeable metallic layer formed by vapor deposition, thereby obviating the critical point in carbon dioxide permeation property due to change in radius and length of the impermeable layer. The metallic layer formed by vapor deposition is very unlikely to deprive the hose of its flexibility, and thus retains a wall having a satisfactorily high level of impermeability to carbon dioxide.

A layer formed by a metallic foil is nearly completely impermeable to carbon dioxide, but its impermeability is greatly lowered upon breakage of the foil under tension. On the other hand, a layer formed by vapor deposition is more reliable, though its original impermeability to carbon dioxide may be somewhat lower than that of a foil. It does not break easily under tension, but remains substantially unchanged in impermeability even under tension. Thus, it is more advantageous to use a layer formed by vapor deposition so far as a particular level of impermeability to carbon dioxide can be obtained by using it, or by combining it with other means enabling it to exhibit a still higher level of impermeability. As it does not break easily, it is also free from any such concentration of stress as occurs at a broken part of a foil which in turn causes another layer, as of a resin, to break.

The above and other objects and advantages of this invention will become more apparent from the following description and the accompanying drawings.

DETAILED DESCRIPTION OF THE INVENTION

Figure 1A:
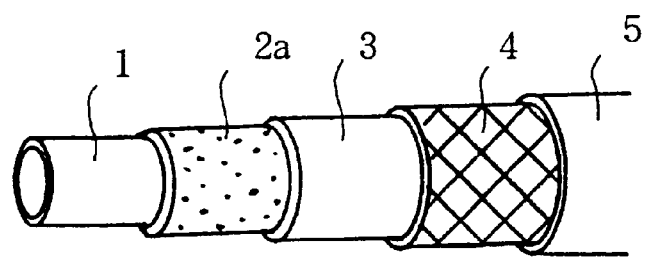
FIGS. 1A, 1B, 2A and 2B are all partly cutaway perspective views showing the arrangement of layers forming the wall of a hose embodying this invention.

According to a preferred aspect of this invention, there is provided a hose for transporting carbon dioxide refrigerant which has a wall formed by a plurality of layers including at least one resin or rubber layer forming an inner tube and an impermeable metallic layer formed by vapor deposition on the outer surface of the resin or rubber layer. The layer formed by vapor deposition is of high uniformity and continuity, particularly when formed on the resin layer.

According to another preferred aspect of this invention, there is provided a hose having a wall formed by a plurality of layers including at least one resin or rubber layer forming an inner tube and an impermeable layer composed of at least one resin film and at least one metallic layer formed thereon by vapor deposition and surrounding the resin or rubber layer. The resin film protects the metallic layer from any serious expansion, or damage even if the hose may have its wall expanded radially or stretched axially by the pressure of the fluid flowing therein, or may be bent or deformed for some cause or other. The resin film is preferably of an ethylene-vinyl alcohol copolymer (EVOH). The copolymer is highly impermeable to carbon dioxide and forms a layer having a still higher impermeability to the refrigerant. The film more preferably has a thickness of 10 to 150 microns, and still more preferably has a flexural modulus of 18,000 to 40,000 $kgf/cm^2$, so that the copolymer may not undesirably lower the flexibility of the hose, while rendering its wall highly impermeable to carbon dioxide.

The impermeable layer is preferably formed by a tape composed of a resin film with the layer formed thereon by vapor deposition, and wound helically about the inner layer, or extended longitudinally along the inner layer to be lapped about it. The impermeable layer is, thus, easy to form about a cylindrical shaped hose. The tape is preferably so wound or lapped that two adjoining edges thereof may overlap each other to some extent to ensure fluid tightness.

The impermeable layer is more preferably a laminate including at least one metallic layer formed by vapor deposition in a manner to be held between a pair of resin films. This structure not only ensures the advantages of this invention as stated above, but is also effective for improving the adherence between the impermeable layer and any other layer adjoining it and preventing their separation.

The invention will now be described in further detail with reference to the drawings.

Hose:

The hose of this invention is used for transporting carbon dioxide refrigerant for e.g. an automobile or household air conditioner, and has a wall formed by a plurality of layers including at least one impermeable metallic layer formed by vapor deposition and having a high impermeability to the refrigerant. Although its layer structure may not otherwise be specifically limited, a typical combination of layers includes a layer or layers forming an inner tube, at least one impermeable layer, a reinforcing layer and a layer forming an outer tube. The impermeable layer may surround the inner tube, or may be present between two adjoining layers forming the inner tube. Specific examples are shown in FIGS. 1A, 1B, 2A and 2B.

Figure 1B:
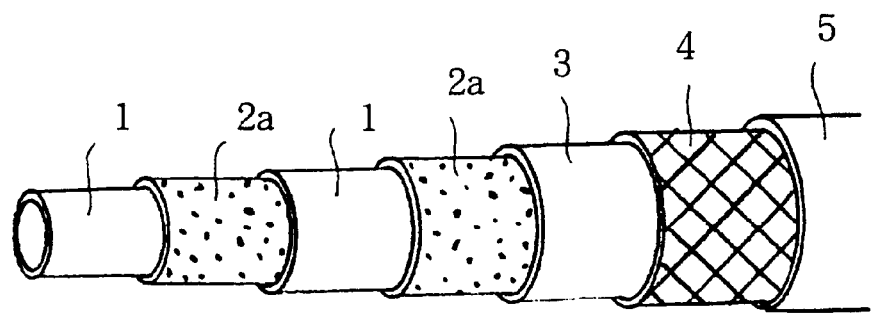

FIG. 1A shows a wall structure formed by: an inner tube having an inner layer 1 of rubber or preferably a resin, an impermeable metallic layer 2a formed thereon by vapor deposition, and an outer layer 3 of rubber or resin; a reinforcing layer 4 surrounding the inner tube; and an outer tube 5. FIG. 1B shows a structure differing from that shown in FIG. 1A, as the inner tube includes a first inner layer 1, a first impermeable metallic layer 2a, a second inner layer 1 and a second impermeable metallic layer 2a formed in this order and surrounded by an outer layer 3.

Figure 2A:
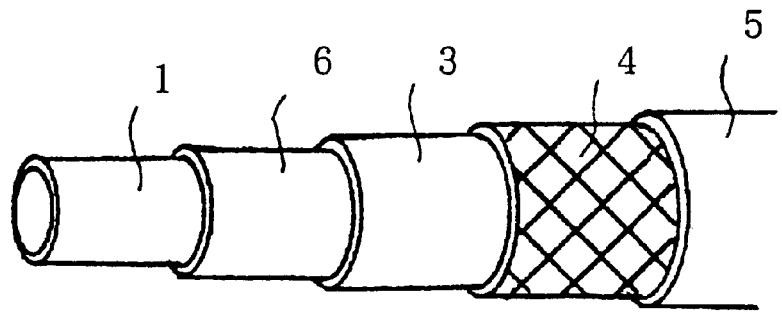
Figure 2B:
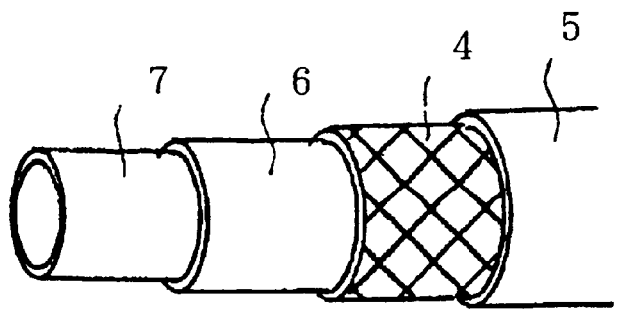

FIG. 2A shows a structure differing from that shown in FIG. 1A, as the inner tube includes an impermeable layer 6 disposed between an inner layer 1 of rubber, preferably butyl rubber and an outer layer 3. The impermeable layer is composed of at least one resin film with a metallic layer formed thereon by vapor deposition, as will be described later in detail. FIG. 2B shows a structure differing from that shown in FIG. 2A, as an inner tube 7 is formed of a single layer of rubber, preferably butyl rubber, and has an impermeable layer 6 formed thereon.

Inner Tube:

The inner tube is formed of one or more layers of rubber, or a resin. If its layer or layers are of rubber, it or they may, for example, be of butyl rubber, chlorinated butyl rubber, brominated butyl rubber, acrylonitrile-butadiene rubber, chlorinated polyethylene rubber, ethylene-propylene-diene rubber, or chlorosulfonated polyethylene rubber. If it or each layer is of a resin, it may be of any resin not undesirably lowering the flexibility of the hose, such as a polyamide, or polyester resin, and have a thickness not exceeding, say, 150 microns.

When a metallic layer is formed on a layer of the inner tube by vapor deposition, the layer of the inner tube should preferably be of a resin so as to ensure the uniformity and continuity of the metallic layer. On the other hand, when a laminate layer is formed to include a metallic layer formed by vapor deposition, the layer of the inner tube should preferably be of rubber to avoid the separation of the laminate layer therefrom.

Impermeable Layer:

(1) Metallic Layer Formed by Vapor Deposition:

According to one aspect of this invention, the impermeable metallic layer is formed by vapor deposition on the outer surface of the resin or rubber layer forming the inner tube. The metallic layer may be formed between the layers of the inner tube, or on the outer or outermost layer of the inner tube having a single or plural layers as shown in FIGS. 2A AND 2B. The metallic layer is preferably so positioned as not to contact the reinforcing layer. It can be formed from any suitable metal, such as aluminum or steel, though aluminum may be preferred from an economical standpoint. It preferably has a thickness of, say, 50 to 900 Å.

Figure 3A:
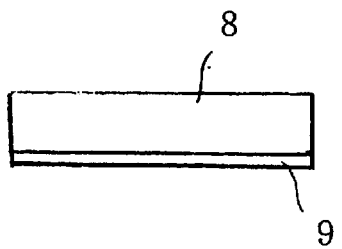
FIGS. 3A to 3C are all fragmentary longitudinal sectional views of the wall of a hose embodying this invention.
Figure 3B:
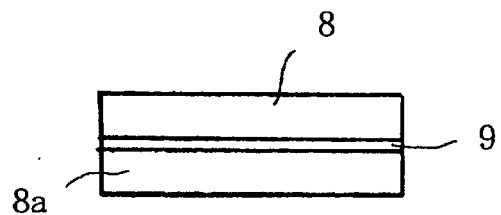
Figure 3C:
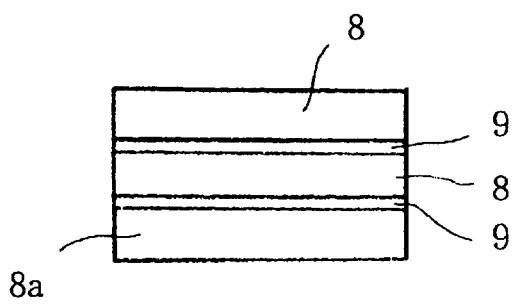

(2) Metallic Layer Formed on a Resin Film:

According to another aspect of this invention, the impermeable layer is composed of at least one resin film and at least one metallic layer formed thereon by vapor deposition. A preferred structure is shown in FIG. 3A, and consists of a resin film 8 and a metallic layer 9 formed on one side thereof by vapor deposition. Other structures that are more preferable are shown in FIGS. 3B and 3C. FIG. 3B shows a laminated structure obtained by fusing or sticking another resin film 8a to that side of the structure as shown in FIG. 3A on which the metallic layer 9 is formed. FIG. 3C shows a laminated structure obtained by fusing or sticking together the structures as shown in FIGS. 3A and 3B. Any such structure can be positioned, for example, between two layers forming the inner tube, or about the inner tube composed of a single or plural layers.

The resin film is preferably of EVOH because of its high impermeability to carbon dioxide, though it may be of any other thermoplastic resin, such as a polyester or polyamide resin. It preferably has a thickness of 10 to 150 microns and a flexural modulus of 18,000 to 40,000 kgf/cm$^2$, so that the resin may not undesirably lower the flexibility of the hose.

Figure 4A:
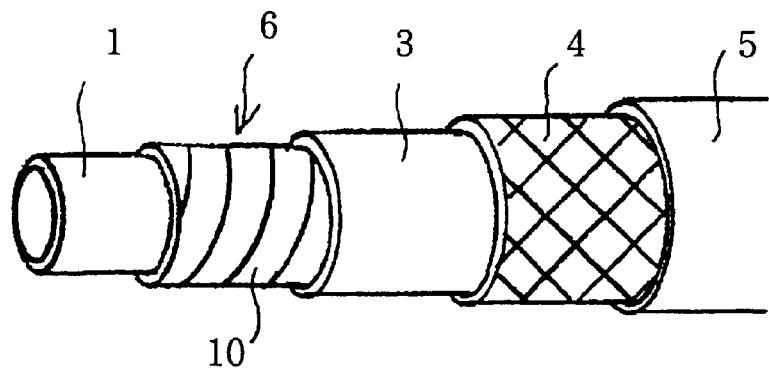
FIGS. 4A and 4B are all views showing a metallic layer embodying this invention.
Figure 4B:
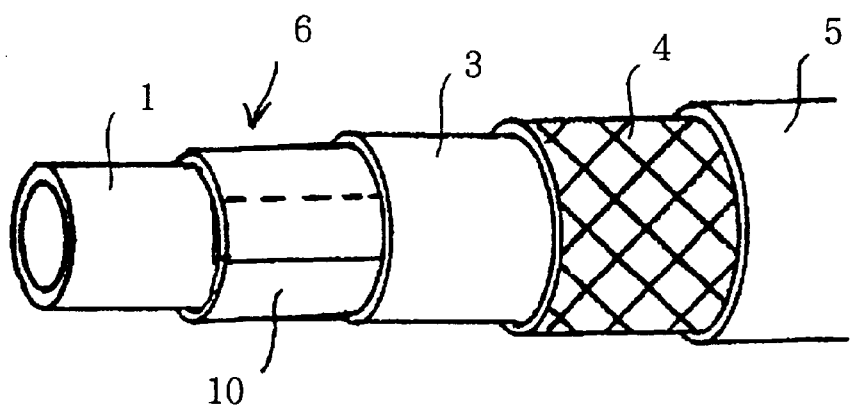

A suitable method can be employed for forming the impermeable layer using the resin film about the inner tube. FIG. 4A shows a tape 10 wound helically about the inner layer 1, while FIG. 4B shows a tape 10 extending longitudinally along the inner layer 1 and lapped about it. The two adjoining edges of the tape 10 preferably overlap each other to some extent to ensure the fluid tightness of the layer 6, and more preferably have their overlapping edges fused or adhesively bonded to each other.

Reinforcing Layer:

The reinforcing layer may be of any known suitable structure, and may, for example, be a layer of braided wire, or reinforcing fiber, a combination of two layers formed by winding reinforcing fiber spirally in opposite directions, or a combination of two such layers and an intermediate layer of rubber sandwiched therebetween.

Outer Tube:

The outer tube is preferably of rubber, though it may be of any other suitable material. Therefore, it may, for example, be of chloroprene rubber, butyl rubber, CSM or EPDM.

The invention will now be described more specifically based on a few examples embodying it and a comparative example.

EXAMPLES 1 AND 2 AND COMPARATIVE EXAMPLE 1

Preparation of Hoses:

A number of hoses for transporting carbon dioxide refrigerant were prepared by a known process, and are shown at Examples 1 and 2 and Comparative Example 1, respectively, in Table 1 below. Each hose had an inside diameter of 5 mm, and its wall was composed of: an inner tube having an inner layer of butyl rubber having a thickness of 1 mm, an impermeable layer formed by winding helically a laminated tape having a metallic layer or foil held between two resin films, and an outer layer of butyl rubber having a thickness of 0.5 mm; a reinforcing layer of braided aramid fiber; and an outer tube of EPDM having a wall thickness of 1 mm defining an outermost layer, as shown in Table 1.

pressure guage 22 and a valve 23. The valve 23 was opened to evacuate the hose 20, the hose 20 was charged with $CO_2$ in an amount giving it an initial internal pressure P1 of 10 MPa at a temperature of 80° C., and after it was left to stand at that temperature for two hours, the hose was examined for its internal pressure P2 when heated.

TABLE 1

| Hose | | | | | | Example 1 | Example 2 | Comparative 1 |
|---|---|---|---|---|---|---|---|---|
| | Inner tube | | Inside diameter | | | φ5 | φ5 | φ5 |
| | | | Inner layer | | Material | IIR | IIR | IIR |
| | | | | | Thickness | 1 mm | 1 mm | 1 mm |
| | | Impermeable layer | Laminated tape | resin film | Material | PET | EVOH | EVOH |
| | | | | | Thickness | 25 μm | 25 μm | 25 μm |
| | | | | Metallic layer | Material | Aluminum layer formed by vapor deposition | Aluminum layer formed by vapor deposition | Aluminum foil |
| | | | | | Thickness | 450 Å | 450 Å | 15 μm |
| | | | | resin film | Material | PET | EVOH | EVOH |
| | | | | | Thickness | 25 μm | 25 μm | 25 μm |
| | | | | Formed by | | Helical winding | Helical winding | Helical winding |
| | | Outer layer | | | Material | IIR | IIR | IIR |
| | | | | | Thickness | 0.5 mm | 0.5 mm | 0.5 mm |
| | Reinforcing layer | | | | Material | Aramid fiber | Aramid fiber | Aramid fiber |
| | | | | | Formed by | Braiding | Braiding | Braiding |
| | Outer tube | | | | Material | EPDM | EPDM | EPDM |
| | | | | | Thickness | 1 mm | 1 mm | 1 mm |
| Evaluation | Permeation of $CO_2$ (g/m/72 h) | | | | Initial | 0.25 | 0.07 | 0.005 |
| | Permeation of $CO_2$ after stretching (g/m/72 h) | | | Degree of stretching | 4% | 0.28 | 0.09 | 0.005 |
| | | | | | 8% | 0.37 | 0.12 | 0.17 |
| | | | | | 12% | 0.41 | 0.17 | 0.19 |
| | | | | | 16% | 0.42 | 0.21 | 0.20 |
| | | | | | 20% | 0.45 | 0.21 | 0.21 |
| | | | | Flexibility (N) | | 12 | 11 | 15 |

The laminated tape used for the hose according to Example 1 was of two PET (polyethylene terephthalate) films each having a thickness of 25 microns and an aluminum layer formed by vapor deposition and having a thickness of 450 Å. The tape used for Example 2 was of two EVOH films each having a thickness of 25 microns and an aluminum layer formed by vapor deposition and having a thickness of 450 Å. The tape used for Comparative Example 1 was of two EVOH films each having a thickness of 25 microns and an aluminum foil having a thickness of 15 microns.

Evaluation:

The hoses were evaluated for the impermeability of their walls to carbon dioxide, as well as for flexibility. Their evaluation for impermeability was carried out by comparing the initial permeation of carbon dioxide and its permeation as determined after applying tension axially to each hose for stretching it by certain percentages (see Table 1) and then ceasing this stretching. Their evaluation for flexibility was carried out by cutting each hose to an appropriate length, bending it about a radius of 100 mm and measuring the repulsive force (N) produced by it when it was bent at an angle of 180°.

Figure 5:
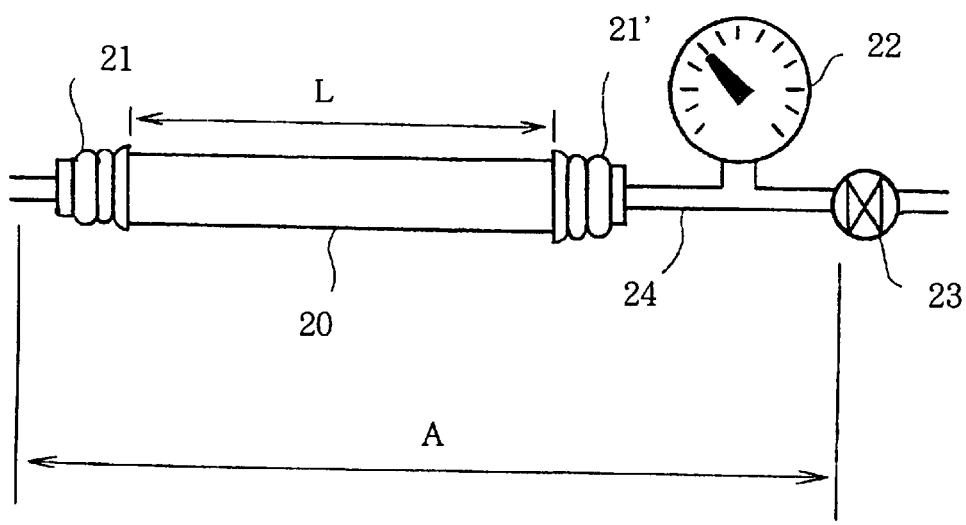
FIG. 5 is a diagram showing a system employed for examining hoses for the permeation of carbon dioxide through their walls.

FIG. 5 shows a system employed for determining the permeation of carbon dioxide. Each hose 20 having a length L (m) was fitted with joints 21 at both ends, and while the joint 21 at one end was tightly closed, the joint 21' at the other end was connected to a pipe 24 provided with a The initial internal pressure P1 of the hose and its internal pressure P2 when heated were used for the calculation of the amount of permeation of $CO_2$. If the $CO_2$ employed in the above system is regarded as a perfect gas, the internal pressure P (Pa) of the hose, its volume V (m³), the weight G (kg) of $CO_2$ and the temperature T (°K) have the relationship $$PV = GRT \tag{1}$$

and this equation can be rewritten into $$G = (V/RT)P \tag{2}$$

where R is the gas constant of $CO_2$, or $0.189 \times 10^3$ (J/kg K).

The amount Q (g/m/72 h) of permeation of $CO_2$ is expressed by $$Q = (G1 - G2) \times (1/L) \times (72/t) \tag{3}$$

where G1 is the initial weight (kg) of $CO_2$ in the hose and G2 is its weight (kg) in the hose after being heated, while t is the heating time (h).

By the substitution of equation 2 for G in equation 3 and its expansion, equation 3 becomes $$Q = \{(V/RT)(P1-P2)\} \times (72/Lt) \times 10^3 (g/m/72 \ h) \tag{4}$$

Figure 6:
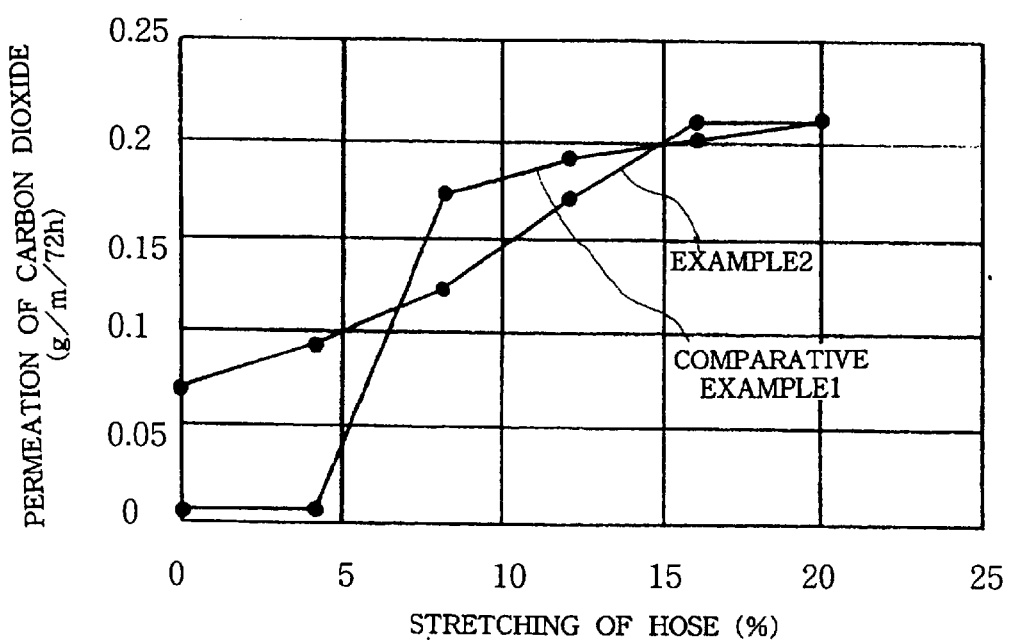
FIG. 6 is a graph showing the permeation of carbon dioxide through the walls of hoses in relation to the percentage by which they were stretched.

Table 1 shows the results of the above evaluation and calculation, and FIG. 6 shows the relations as found from Example 2 and Comparative Example 1 between the stretching of the hoses and the permeation of carbon dioxide through their walls. It is obvious therefrom that the wall of a hose having an impermeable layer including a resin film or films and a metallic layer or layers formed by vapor deposition keeps a high level of impermeability to carbon dioxide not sharply dropping under tension, and a still higher level of impermeability if the resin film or films are of EVOH.

While the invention has been described by way of its preferred embodiments, variations or modifications may be easily made by those skilled in the art without departing from the scope of this invention which is defined by the appended claims.

What is claimed is:

1. A hose useful for transporting carbon dioxide refrigerant, having a wall comprising: a plurality of layers including at least one carbon-dioxide-impermeable metallic layer formed by vapor deposition in a manner to be held between a pair of thin resin films, the metallic layer being interposed between a radially inner layer and a radially outer layer of the plurality of layers.

2. A hose as set forth in claim 1, adapted for use in an automobile air conditioner.

* * * * *